US012580257B2

(12) United States Patent
Tang et al.

(10) Patent No.: US 12,580,257 B2
(45) Date of Patent: Mar. 17, 2026

(54) BATTERY, MANUFACTURING METHOD AND MANUFACTURING SYSTEM THEREOF, AND ELECTRIC APPARATUS

(71) Applicant: CONTEMPORARY AMPEREX TECHNOLOGY (HONG KONG) LIMITED, Hong Kong (CN)

(72) Inventors: Yu Tang, Ningde (CN); Peng Wang, Ningde (CN); Yue Liu, Ningde (CN); Zengzhong Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 516 days.

(21) Appl. No.: 18/064,939

(22) Filed: Dec. 13, 2022

(65) Prior Publication Data

US 2023/0116169 A1     Apr. 13, 2023

Related U.S. Application Data

(63) Continuation of application No. PCT/CN2021/122180, filed on Sep. 30, 2021.

(51) Int. Cl.
*H01M 50/209*          (2021.01)
*H01M 10/6554*        (2014.01)
(Continued)

(52) U.S. Cl.
CPC ..... *H01M 50/209* (2021.01); *H01M 10/6554* (2015.04); *H01M 10/6556* (2015.04);
(Continued)

(58) Field of Classification Search
CPC ........... H01M 50/209; H01M 10/6554; H01M 10/6556; H01M 50/103; H01M 50/242;
(Continued)

(56) References Cited

U.S. PATENT DOCUMENTS 9,246,200 B2    1/2016   Kang et al.
10,644,275 B2   5/2020   McCollum
(Continued)

FOREIGN PATENT DOCUMENTS

CN          103201876 A      7/2013
CN          209249567 U      8/2019
(Continued)

OTHER PUBLICATIONS

International Search Report received in International Application PCT/CN2021/122180, mailed May 26, 2022.
(Continued)

*Primary Examiner* — Helen Oi K Conley
(74) *Attorney, Agent, or Firm* — K&L Gates LLP

(57)          ABSTRACT

Embodiments of this application provide a battery, a manufacturing method and a manufacturing system thereof, and an electric apparatus. The battery provided by the embodiments of this application includes a plurality of battery modules, where each of the battery modules includes a plurality of battery cells stacked in a first direction, the battery cell is provided with a first end face and a second end face that face away from each other in a second direction, with an electrode terminal disposed on the first end face, and the plurality of battery modules are stacked in a third direction; and the first direction, the second direction, and the third direction are perpendicular to each other.

20 Claims, 8 Drawing Sheets

2

(51) Int. Cl.
  *H01M 10/6556*  (2014.01)
  *H01M 50/103*  (2021.01)
  *H01M 50/242*  (2021.01)
  *H01M 50/264*  (2021.01)

(52) U.S. Cl.
  CPC ....... *H01M 50/103* (2021.01); *H01M 50/242* (2021.01); *H01M 50/264* (2021.01); *H01M 2220/20* (2013.01)

(58) Field of Classification Search
  CPC .......... H01M 50/264; H01M 2220/20; H01M 2220/10; H01M 50/251; H01M 10/0468; H01M 10/613; H01M 50/258; Y02E 60/10
  See application file for complete search history.

(56) References Cited

U.S. PATENT DOCUMENTS

| | | |
|---|---|---|
| 2017/0133642 A1 | 5/2017 | Lee |
| 2020/0161612 A1 | 5/2020 | Lee et al. |

FOREIGN PATENT DOCUMENTS

| | | | |
|---|---|---|---|
| CN | 209447945 | U | 9/2019 |
| CN | 112331926 | A | 2/2021 |
| CN | 112703632 | A | 4/2021 |
| JP | 2012033306 | A | 2/2012 |
| JP | 2012099483 | A | 5/2012 |
| JP | 2014504779 | A | 2/2014 |
| JP | 2019067582 | A | 4/2019 |
| JP | 2019110020 | A | 7/2019 |
| JP | 2019197648 | A | 11/2019 |
| JP | 2020087750 | A | 6/2020 |
| KR | 1020170054100 | A | 5/2017 |
| WO | 2012066875 | A1 | 5/2012 |
| WO | 2014109034 | A1 | 7/2014 |
| WO | 2018062226 | A1 | 4/2018 |
| WO | 2020129274 | A1 | 6/2020 |
| WO | 2021098440 | A1 | 5/2021 |

OTHER PUBLICATIONS

The extended European Search Report received in the corresponding European Application 21944408.0, mailed Jan. 26, 2024.

Notice of Reasons for Refusal received in the corresponding Japanese Application 2023-501547, mailed Mar. 4, 2024.

The Notice of Reasons for Refusal received in the counterpart Japanese application 2023-501547, mailed on Oct. 28, 2024.

The Request for the Submission of an Opinion received in the counterpart Korean application 10-2023-7001268, mailed on Feb. 4, 2025.

BATTERY, MANUFACTURING METHOD AND MANUFACTURING SYSTEM THEREOF, AND ELECTRIC APPARATUS

CROSS-REFERENCE TO RELATED APPLICATIONS

This application is a continuation of International Application PCT/CN2021/122180, filed Sep. 30, 2021 and entitled "BATTERY, MANUFACTURING METHOD AND MANUFACTURING SYSTEM THEREOF, AND ELECTRIC APPARATUS", which is incorporated herein by reference in its entirety.

TECHNICAL FIELD

This application relates to the technical field of batteries, and in particular, to a battery, a manufacturing method and a manufacturing system thereof, and an electric apparatus.

BACKGROUND

Batteries are widely used in electric apparatuses, such as electric cabinets, electric bicycles, electric vehicles, electric airplanes, electric ships, electric toy cars, electric toy ships, electric toy airplanes, and electric tools. Battery cells may include nickel-cadmium battery cells, nickel-hydrogen battery cells, lithium-ion battery cells, secondary alkaline zinc-manganese battery cells, and the like.

During development of the battery technology, in addition to improvement in performance of battery cells, people are also paying more attention to volumes of electric apparatuses, hoping that volumes of electric apparatuses are reduced as much as possible. This imposes new requirements on the internal layout of batteries. How rational and flexible layout is implemented for internal structures of batteries is a problem to be urgently resolved.

SUMMARY

This application provides a battery, a manufacturing method and a manufacturing system thereof, and an electric apparatus, making the internal structural layout of a battery more flexible and more rational.

According to a first aspect, embodiments of this application provide a battery. The battery includes a plurality of battery modules, where each of the battery modules includes a plurality of battery cells stacked in a first direction, the battery cell is provided with a first end face and a second end face that face away from each other in a second direction, with an electrode terminal disposed on the first end face, and the plurality of battery modules are stacked in a third direction; where the first direction, the second direction, and the third direction are perpendicular to each other.

In the battery provided according to the embodiments of this application, the battery cells are stacked in the first direction to form battery modules, and the battery modules are stacked in the third direction. In this way, an appropriate quantity of battery cells in the first direction and an appropriate size and quantity of battery modules in the third direction can be set according to the internal spatial layout of an electric apparatus such as a vehicle, so that spaces in the first direction and the third direction are fully utilized, improving capacity of the battery. In addition, the electrode terminals face a direction different than the stacking direction of the battery cells and the stacking direction the battery modules, so that gaps between the battery cells in their stacking direction and gaps between the battery modules in their stacking direction can be reduced, effectively increasing volumetric energy density of the battery.

In the battery provided according to the embodiments of this application, each of the battery modules includes a plurality of battery groups disposed side by side in the second direction, each of the battery groups includes a plurality of battery cells stacked in the first direction, and the second end faces of the battery cells in two adjacent battery groups face opposite directions. This make it easier to assemble the battery, for example, easier to mount components such as a sampling wire harness. Such arrangement can fully utilize space of an electric apparatus such as a vehicle in the second direction, making utilization of the space in the second direction more efficient.

In the battery provided according to the embodiments of this application, housing side walls of the battery cell include two first side walls opposite each other and two second side walls opposite each other, where an area of the first side wall is greater than that of the second side wall, and the first side wall is perpendicular to the first direction. This helps improves structural stability of the battery groups formed by the battery cells, which in turn improves structural stability of the battery modules and the battery.

In the battery provided according to the embodiments of this application, a maximum length of the battery module in the first direction is $L_1$, a maximum length of the battery module in the second direction is $L_2$, and $L_1=L_2$. This helps the battery module to have a square envelope, facilitating flexible layout of the battery modules.

In the battery provided according to the embodiments of this application, the second end faces of the battery cells of adjacent battery modules are perpendicular to each other. This helps improve bonding strength between adjacent battery modules, which in turn improves structural strength of the whole battery.

In the battery provided according to the embodiments of this application, the battery further includes a reinforcing plate, and the reinforcing plate is disposed between two adjacent battery modules. With provision of the reinforcing plate, the battery is not prone to problems such as deformation and displacement, thereby improving the overall structural strength of the battery.

In the battery provided according to the embodiments of this application, a flow channel is formed in the reinforcing plate, the flow channel contains a fluid, and the fluid is used for heat exchange with the battery modules. In this way, with the fluid, heat exchange with the battery modules can be implemented so as to heat or cool the battery modules.

In the battery provided according to the embodiments of this application, the battery further includes a pipeline, and the pipeline is configured to communicate the flow channels of the reinforcing plates that are adjacent to each other in the third direction. Such arrangement can simplify the structure communicating the flow channels in the reinforcing plates with the outside.

In the battery provided according to the embodiments of this application, the battery module further includes end plates, and the end plates are disposed on two sides in the first direction of the plurality of battery cells that are stacked; and the battery further includes a frame, the frame is disposed around an outer periphery of the battery module, and the end plates connect the battery module and the frame. Provision of the end plates helps assembling of the battery cell. In addition, provision of the frame can provide some protection for the battery module, prolonging service life of the battery module.

In the battery provided according to the embodiments of this application, a first lug boss is formed on the end plate, a second lug boss is formed on the frame, and the first lug boss is buckled to the second lug boss. Such arrangement helps connection between the end plates and the frame and also helps airtightness of the battery after the end plates and the frame are connected.

In the battery provided according to the embodiments of this application, the battery includes a plurality of frames stacked in the third direction, and the frames that are adjacent in the third direction are hermetically connected. Adjacent frames being hermetically connected can effectively reduce water and oxygen entering the battery module from the outside, thereby reducing the probability of corrosion of the battery cells caused by the external water and oxygen.

The battery further includes a mounting rack, and the plurality of battery modules are connected to the mounting rack through the frames.

In the battery provided according to the embodiments of this application, a mounting plate is formed on the mounting rack, and the frames in two adjacent layers are connected through the mounting plate. This helps placement of the battery module and the frame, avoiding misplacement or deformation of the battery module and the frame when they are being connected to the mounting rack, reducing mounting errors, and helping improve airtightness of the battery.

According to a second aspect, embodiments of this application provide a manufacturing method of battery, including: providing a plurality of battery cells, where the battery cell is provided with a first end face and a second end face that face away from each other in a second direction, with an electrode terminal disposed on the first end face; stacking a number of the battery cells in a first direction to form a battery module; and stacking a plurality of such battery modules in a third direction, where the first direction, the second direction, and the third direction are perpendicular to each other.

According to a third aspect, embodiments of this application provides a manufacturing system of battery, including: a provision module, configured to provide a plurality of battery cells, where the battery cell is provided with a first end face and a second end face that face away from each other in a second direction, with an electrode terminal disposed on the first end face; a first assembling module, configured to stack a number of the battery cells in a first direction to form a battery module; and a second assembling module, configured to stack a plurality of assembling modules in a third direction, where the first direction, the second direction, and the third direction are perpendicular to each other.

In the battery, the manufacturing method and the manufacturing system thereof, and the electric apparatus provided by the embodiments of this application, the battery cells are stacked in the first direction to form battery modules, and the battery modules are stacked in the third direction. In this way, an appropriate quantity of battery cells in the first direction and an appropriate size and quantity of battery modules in the third direction can be set according to the internal spatial layout of an electric apparatus such as a vehicle, so that the spaces in the first direction and the third direction are fully utilized, improving capacity of the battery. In addition, the electrode terminals face a direction different than the stacking direction of the battery cells and the stacking directions of the battery modules, so that gaps between the battery cells in their stacking direction and gaps between the battery modules in their stacking direction can be reduced, effectively increasing volumetric energy density of the battery.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and persons of ordinary skill in the art may still derive other drawings from the accompanying drawings without creative efforts.

Figure 1:
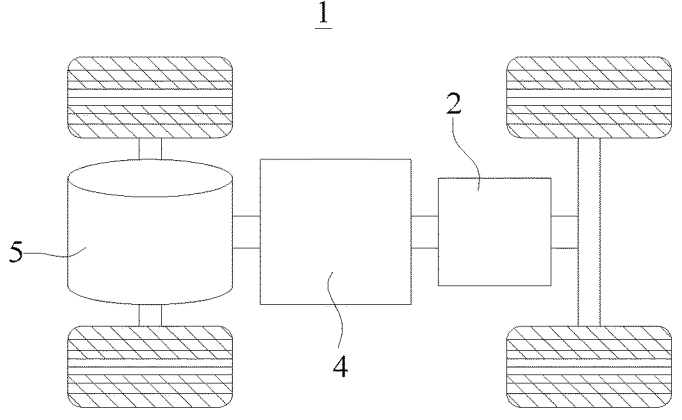
FIG. 1 is a schematic structural diagram of a vehicle according to some embodiments of this application.

REFERENCE SIGNS ARE DESCRIBED AS FOLLOWS 1. vehicle;
2. battery; 21. battery module; 211. battery group; 212. end plate; 212a. first lug boss; 22. reinforcing plate; 23. pipeline; 24 frame; 24a. second mounting hole; 24b. second lug boss; 25. mounting rack; 251. mounting plate; 251a. first mounting hole;
3. battery cell; 31. housing assembly; 311. housing; 311a. second end face; 311b. first side wall; 311c. second side wall; 312. cover assembly; 3121. end cover; 3121a. first end face; 3122. electrode terminal; 32. electrode assembly;
4. controller;
5. motor;
100. manufacturing system; 110. provision module; 120. first assembling module; and 130. second assembling module.
X. first direction; Y. second direction; and Z. third direction.

The accompanying drawings are not drawn to scale.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application belongs. The terms used in the specification of this application are merely intended to describe the specific embodiments but not intended to constitute any limitation on this application. The terms "include", "comprise", "have", and any variations thereof in the specification and claims of this application and the foregoing description of the drawings are intended to cover non-exclusive inclusions. In the specification, claims, or accompanying drawings of this application, the terms "first", "second", and the like are intended to distinguish between different objects but do not indicate a particular order or a subordinate relationship.

An "embodiment" mentioned in this application means that specified features, structures, or characteristics described with reference to this embodiment may be included in at least one embodiment of this application. The word "embodiment" in various places in the specification does not necessarily refer to a same embodiment, or an independent or alternative embodiment that is exclusive of other embodiments.

In the descriptions of this application, it should be noted that unless otherwise specified and defined explicitly, the terms "mount", "connect", "join", and "attach" should be understood in their general senses. For example, the terms may refer to a fixed connection, a detachable connection, or an integral connection, or may be a direct connection, an indirect connection through an intermediate medium, or an internal connection between two elements. Persons of ordinary skill in the art can understand specific meanings of these terms in this application as appropriate to specific situations.

The term "and/or" in this application describes only an association relationship for describing associated objects and represents that three relationships may be present. For example, A and/or B may represent presence of the following three cases: only A, both A and B, and only B. In addition, the character "/" in this application generally indicates an "or" relationship between the associated objects.

In the embodiments of this application, the same reference signs denote the same components. For brevity, in different embodiments, detailed descriptions of the same components are not repeated. It should be understood that, as shown in the accompanying drawings, sizes such as thickness, length, and width of various components and sizes such as thickness, length, and width of integrated devices in the embodiments of this application are merely used as examples for description and should not constitute any limitation on this application.

In this application, "a plurality of" means more than two (inclusive).

The battery cell in the application may include a lithium-ion secondary battery cell, a lithium-ion primary battery cell, a lithium-sulfur battery cell, a sodium-lithium-ion battery cell, a sodium-ion battery cell, a magnesium-ion battery cell, or the like. This is not limited in the embodiments of this application. The battery cell may be cylindrical, flat, or rectangular, or have other shapes. This is also not limited in the embodiments of this application. By packaging method, battery cells are typically classified into three types: cylindrical cells, prismatic cells, and pouch cells. This is not limited in the embodiments of this application either.

The battery mentioned in the embodiments of this application is a single physical module that includes one or more battery cells for providing a higher voltage and capacity. For example, the battery mentioned in this application may include an electric cabinet, a battery pack, or the like. The battery typically includes a box configured to package one or more battery cells. The box can prevent liquids or other foreign matters from affecting charging or discharging of the battery cell.

The battery cell includes an electrode assembly and an electrolyte. The electrode assembly includes a positive electrode plate, a negative electrode plate, and a separator. Operation of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. The positive electrode current collector includes a positive electrode current collecting part and a positive electrode protrusion protruding out of the positive electrode current collecting part. The positive electrode current collecting part is coated with the positive electrode active substance layer, at least part of the positive electrode protrusion is uncoated with the positive electrode active substance layer, and the positive electrode protrusion is used as a positive electrode tab. With a lithium-ion battery as an example, a material of its positive electrode current collector may be aluminum, and its positive electrode active substance layer includes a positive electrode active substance which may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. The negative electrode current collector includes a negative electrode current collecting part and a negative electrode protrusion protruding out of the negative electrode current collecting part. The negative electrode current collecting part is coated with the negative electrode active substance layer, at least part of the negative electrode protrusion is uncoated with the negative electrode active substance layer, and the negative electrode protrusion is used as a negative electrode tab. A material of the negative electrode current collector may be copper, and the negative electrode active substance layer includes a negative electrode active substance which may be carbon, silicon, or the like. To allow a large current to pass without any fusing, a plurality of positive electrode tabs are provided and stacked together, and a plurality of negative electrode tabs are provided and stacked together. A material of the separator may be PP (polypropylene, polypropylene), PE (polyethylene, polyethylene), or the like. In addition, the electrode assembly may be a winding structure or a laminate structure. The embodiments of this application are not limited thereto though.

The battery cell further includes a housing assembly. An accommodating cavity is provided in the housing assembly.

The accommodating cavity is an enclosed space provided by the housing assembly for the electrode assembly and the electrolyte.

For a battery cell, main safety hazards are in the charging and discharging processes. In addition, a suitable ambient temperature also needs to be designed. To effectively avoid unnecessary losses, triple protection measures are usually provided for battery cells. Specifically, the protection measures at least include a switch component, selection of an appropriate separator material, and a pressure relief mechanism. The switch component is a component which enables a battery to stop charging or discharging when temperature or resistance in a battery cell reaches a specified threshold. The separator is configured to separate the positive electrode plate and the negative electrode plate. Microscale (even nanoscale) micropores attached to the separator can be automatically dissolved when temperature of the separator rises to a specified value, so that metal ions cannot pass through the separator, and an internal reaction in the battery cell is terminated.

The inventors have found that, during assembling a battery, after a plurality of battery cells are stacked in a first direction, the plurality of stacked battery cells cannot be stacked again. As a result, internal space of an electric apparatus cannot be fully utilized, and internal space of the battery is wasted. To satisfy the need of power per unit area, the battery cells stacked in the first direction need to be stacked in multiple layers. However, assembling operations for stacking in multiple layers, a plurality of battery cells which are stacked in the first direction are complicated.

Based on the foregoing problem found by the inventors, the inventors have improved the structures of batteries. The technical solution described in the embodiments of this application is applicable to batteries and electric apparatuses using a battery.

The battery may be an electric cabinet, a battery pack, or the like.

The electric apparatus may be a vehicle, an energy storage cabinet, a ship, a spacecraft, an electric toy, an electric tool, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric vehicle toy, an electric ship toy, an electric airplane toy, and the like. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, an electric planer, and the like. The embodiments of this application impose no special limitation on the foregoing electric apparatus.

For ease of description, the following embodiments are described using the electric apparatus being a vehicle 1 as an example.

FIG. 1 is a schematic structural diagram of a vehicle 1 according to some embodiments of this application. As shown in FIG. 1, the vehicle 1 is provided with a battery 2 inside, and the battery 2 may be disposed at the bottom or in the front or at the rear of the vehicle 1. The battery 2 may be configured to supply power to the vehicle 1. For example, the battery 2 may be used as an operational power supply for the vehicle 1.

The vehicle 1 may further include a controller 4 and a motor 5, and the controller 4 is configured to control the battery 2 to supply power to the motor 5, for example, to satisfy operation power needs during start, navigation, and traveling of the vehicle 1.

In some embodiments of this application, the battery 2 can be used as not only the operational power supply for the vehicle 1 but also a driving power supply for the vehicle 1, replacing all or part of fossil fuel or natural gas to provide driving power for the vehicle 1.

Figure 2:
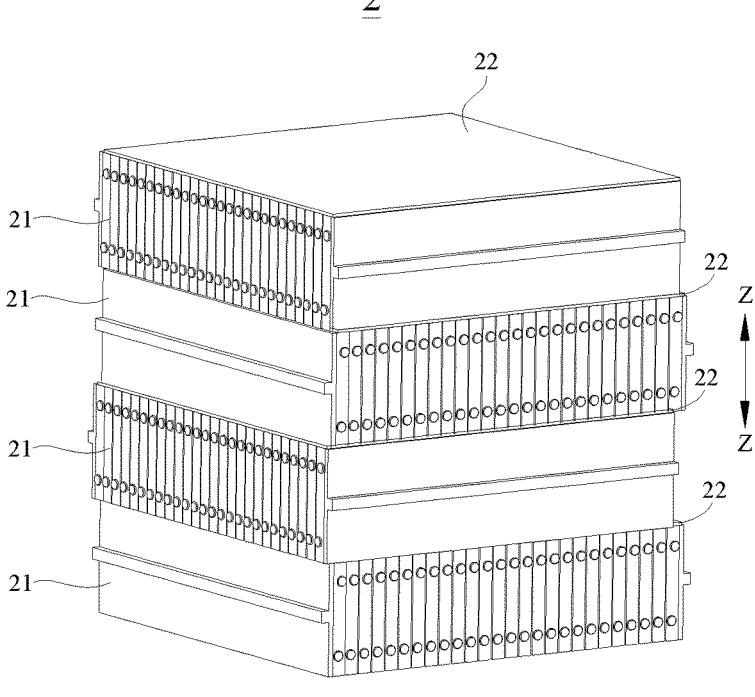
FIG. 2 is a schematic structural diagram of a battery according to some embodiments of this application.
Figure 3:
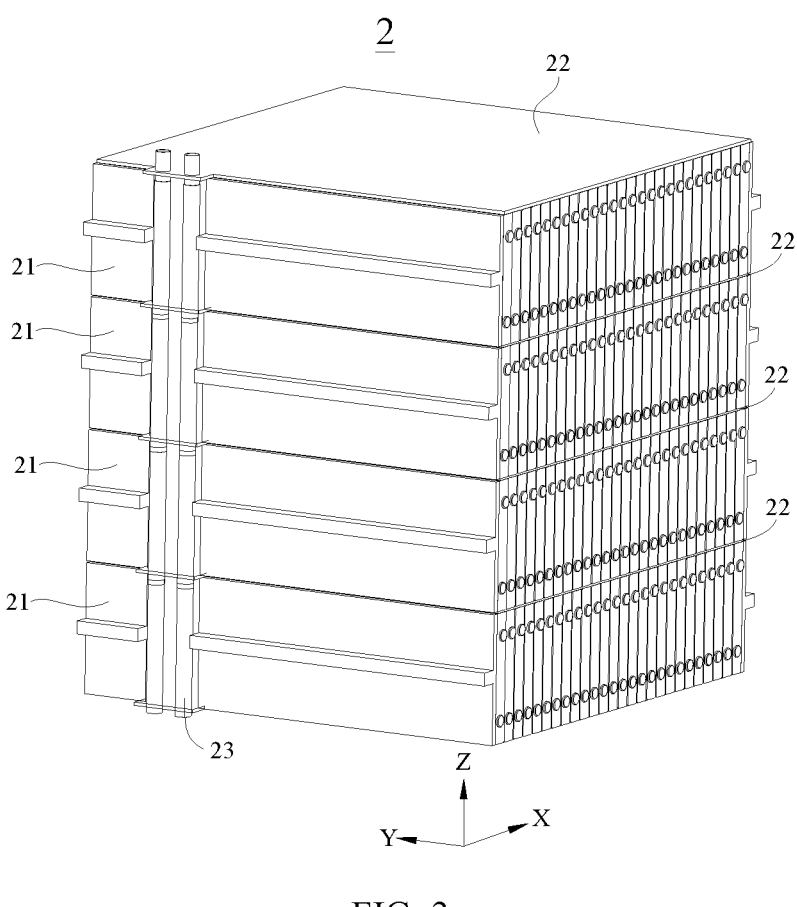
FIG. 3 is a schematic structural diagram of a battery according to some other embodiments of this application.
Figure 4:
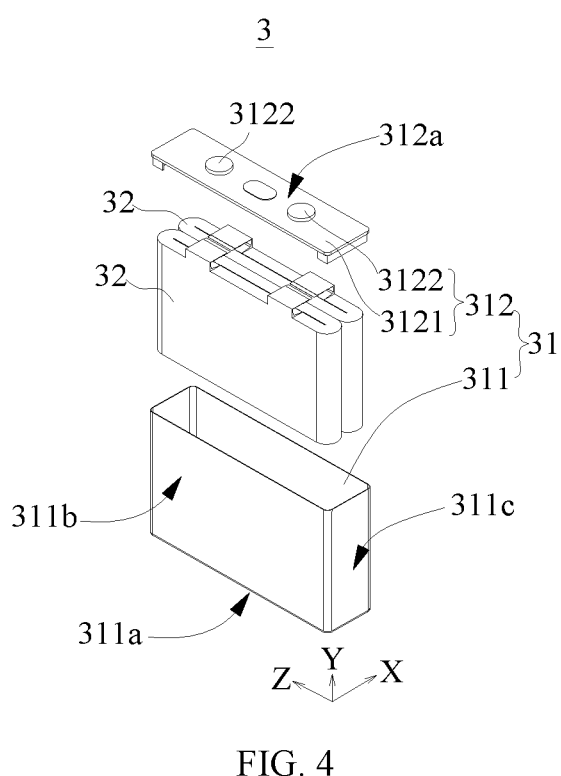
FIG. 4 is a schematic exploded view of a battery cell according to some embodiments of this application.

FIG. 2 and FIG. 3 are schematic structural diagrams of different batteries 2 provided by the embodiments of this application, respectively. FIG. 4 is a schematic exploded view of a battery cell 3 in the battery 2 provided by the embodiments of this application.

There may be one or more battery cells 3 in the battery 2. If a plurality of battery cells 3 are present, the plurality of battery cells 3 may be connected in series, in parallel, or in series and parallel, and being connected in series and parallel means a combination of series and parallel connections of the plurality of battery cells 3. The plurality of battery cells 3 may be directly connected in series, in parallel, or in series and parallel to constitute a whole. Certainly, the plurality of battery cells 3 may first be connected in series, in parallel, or in series and parallel to constitute a battery module 21, and then a plurality of battery modules 21 are connected in series, in parallel, or in series and parallel to constitute a whole.

The plurality of battery cells 3 in the battery module 21 may be electrically connected via a busbar (not shown in the figures), so that the plurality of battery cells 3 in the battery module 21 are connected in series, in parallel, or in series and parallel.

The battery cell 3 provided in the embodiments of this application includes an electrode assembly 32 and a housing assembly 31, and the electrode assembly 32 is accommodated in the housing assembly 31.

In some embodiments, the housing assembly 31 may also be configured to accommodate an electrolyte, for example, a liquid electrolyte. The housing assembly 31 may have various structure forms.

In some embodiments, the housing assembly 31 may include a housing 311 and a cover assembly 312, where the housing 311 is a hollow structure with an opening on one side, the cover assembly 312 covers the opening of the housing 311 to form hermetical connection so as to form an accommodating cavity for accommodating the electrode assembly 32 and the electrolyte.

In some embodiments, the cover assembly 312 includes an end cover 3121, and the end cover 3121 covers the opening of the housing 311. The end cover 3121 may be various structures, for example, the end cover 3121 is a plate structure or a hollow structure with an opening on one end. For example, as shown in FIG. 4, the housing 311 is a rectangular structure, the end cover 3121 is a plate structure, and the end cover 3121 covers an opening on the top of the housing 311.

The end cover 3121 may be made of an insulating material (for example, plastic) or a conductive material (for example, metal). With the end cover 3121 made of a metal material, the cover assembly 312 may further include an insulator, where the insulator is located at a side of the end cover 3121 facing the electrode assembly 32 to insulate the end cover 3121 from the electrode assembly 32.

In some embodiment, the cover assembly 312 may further include electrode terminals 3122, and the electrode terminals 3122 are mounted to the end cover 3121. Two electrode terminals 3122 are provided and defined as a positive electrode terminal and a negative electrode terminal, respectively. Both the positive electrode terminal and the negative electrode terminal are configured to be electrically connected to the electrode assembly 32 to output electric energy generated by the electrode assembly 32.

In some other embodiments, the housing assembly 31 may alternatively be other structures. For example, the housing assembly 31 includes a housing 311 and two cover assemblies 312, where the housing 311 is a hollow structure with openings on two sides opposite each other, one cover assembly 312 correspondingly covers one opening of the housing 311 to form hermetical connection so as to form an accommodating cavity for accommodating the electrode assembly 32 and the electrolyte. In this structure, one cover assembly 312 may be provided with two electrode terminals 3122 while the other cover assembly 312 is provided with no electrode terminal 3122, or each of the two cover assemblies 312 is provided with one electrode terminal 3122.

In the battery cell 3, one or more electrode assemblies 32 may be accommodated in the housing assembly 31. For example, as shown in FIG. 4, there are two electrode assemblies 32.

The battery 2 provided by the embodiments of this application includes a plurality of battery modules 21, where each of the battery modules 21 includes a plurality of battery cells 3 stacked in a first direction X. The battery cell 3 is provided with a first end face 3121*a* and a second end face 311*a* that face away from each other in a second direction Y, with an electrode terminal 3122 disposed on the first end face 3121*a*. The plurality of battery modules 21 are stacked in a third direction Z. The first direction X, the second direction Y, and the third direction Z are perpendicular to each other.

The first direction X and the second direction Y are directions determined based on the structure and arrangement position relationship of the battery cell 3. Different battery modules 21 are stacked in the third direction Z. The first directions X of the battery modules 21 in different layers in the third direction Z may be the same, and the second directions Y thereof may also be the same. The first directions X of the battery modules 21 in different layers in the third direction Z may be perpendicular to each other, and the second directions Y thereof may also be perpendicular to each other.

Each of the battery modules 21 includes a plurality of battery cells 3 stacked in the first direction X. The plurality of battery cells 3 may be distributed in one or more columns.

Figure 5:
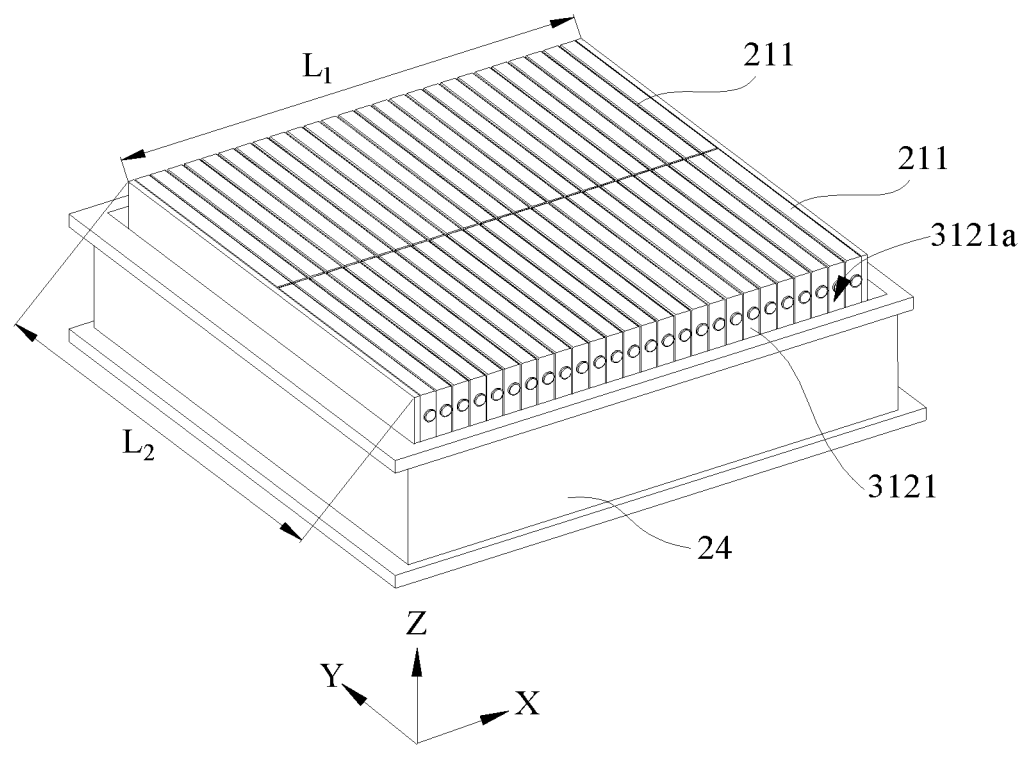
FIG. 5 is a schematic structural diagram of connecting of a battery module and a frame according to some embodiments of this application.
Figure 6:
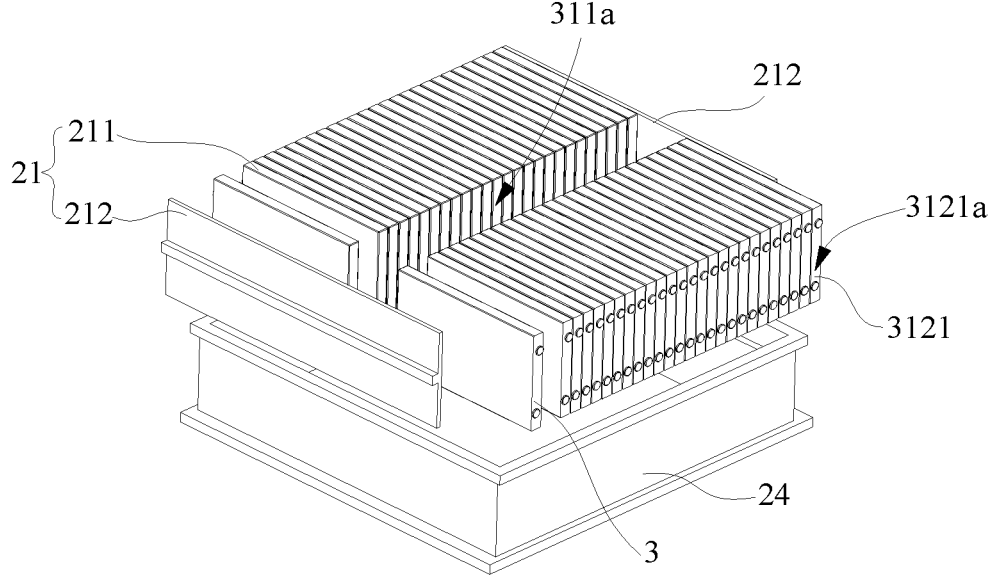
FIG. 6 is an exploded view of FIG. 5.

FIG. 5 shows an implementation with the plurality of battery cells 3 distributed in two columns. FIG. 6 is a schematic exploded view of FIG. 5.

The battery cells 3 are stacked in the first direction X, the electrode terminals 3122 are disposed on one of sides of the battery cells 3 that are opposite in the second direction Y, and the first direction X and the second direction Y are perpendicular to each other. In other words, the stacking direction of the battery cells 3 is set to be perpendicular to directions of the electrode terminals 3122 of the battery cells 3, facilitating stacking of the battery cells 3 in the first direction X.

In some embodiments, the electrode terminals 3122 are disposed only on the first end face 3121*a*. The electrode terminals 3122 include a positive electrode terminal and a negative electrode terminal, and both the positive electrode terminal and the negative electrode terminal are disposed on the first end face 3121*a*.

In some other embodiments, both the first end face 3121*a* and the second end face 311*a* are provided with an electrode terminal 3122. The positive electrode terminal and the negative electrode terminal are disposed on the first end face 3121*a* and the second end face 311*a*, respectively.

The battery cells 3 stacked in the first direction X may be joined together via an adhesive, or directly fit with each other, or be spaced apart. The battery modules 21 stacked in the third direction Z may be spaced apart with an intermediate object or be spaced apart without an intermediate object.

In the battery 2 provided by the embodiments of this application, the battery cells 3 are stacked in the first direction X to form battery modules 21, and the battery modules 21 are stacked in the third direction Z. In this way, an appropriate quantity of battery cells 3 in the first direction X and an appropriate size and quantity of battery modules 21 in the third direction Z can be set according to the internal spatial layout of an electric apparatus such as vehicle 1, so that spaces in the first direction X and the third direction Z are fully utilized, improving capacity of the battery 2. In addition, the electrode terminals 3122 face a direction different than the stacking direction of the battery cells 3 and the stacking direction of the battery modules 21, so that gaps between the battery cells 3 in their stacking direction and gaps between the battery modules 21 in their stacking direction can be reduced, increasing volumetric energy density of the battery 2.

In some embodiments, each of the battery modules 21 includes a plurality of battery groups 211 disposed side by side in the second direction Y, each of the battery groups 211 includes a plurality of battery cells 3 stacked in the first direction X, and second end faces 311*a* of battery cells 3 of two adjacent battery groups 211 face opposite directions.

With the battery module 21 including a plurality of battery groups 211 disposed side by side in the second direction Y, this arrangement can fully utilize the space of the electric apparatus such as vehicle 1 in the second direction Y, making utilization of the space in the second direction Y more efficient, thereby improving capacity of the battery 2. With the second end faces 311*a* of the battery cells 3 of two adjacent battery groups 211 facing opposite directions, the electrode terminals 3122 of the battery cells 3 of two adjacent battery groups 211 face opposite directions. This makes the two adjacent battery groups 211 distributed more compactly, thereby improving utilization of spaces of the battery groups 211 in the second direction Y. In addition, this makes it easier to assemble the battery 2, for example, easier to mount components such as a sampling wire harness.

In some embodiments, side walls of the housing 311 of the battery cell 3 include two first side walls 311*b* opposite each other and two second side walls 311*c* opposite each other, where an area of the first side wall 311*b* is greater than that of the second side wall 311*c*, and the first side wall 311*b* is perpendicular to a first direction X.

The first side wall 311*b* is perpendicular to the first direction X, that is, the first side wall 311*b* is perpendicular to the stacking direction of the battery cells 3. First side walls 311*b* of adjacent battery cells 3 are arranged adjacent to each other in the first direction X. The area of the first side wall 311*b* being greater than that of the second side wall 311*c* means that the first side wall 311*b* is a face with a larger area of the battery cell 3. As such, faces with a larger area of the adjacent battery cells 3 stacked in the first direction X are arranged adjacent to each other. This helps improve structural stability of the battery groups 211 formed by the battery cells 3, thereby improving structural stability of the battery modules 21 and the battery 2.

In some embodiments, a maximum length of the battery module 21 in the first direction X is $L_1$, a maximum length of the battery module 21 in the second direction Y is $L_2$, and $L_1=L_2$.

The maximum length $L_1$ of the battery module 21 in the first direction X is a longest distance between any two points of the battery module 21 in the first direction X. Similarly, the maximum length $L_2$ of the battery module 21 in the second direction Y is a longest distance between any two points of the battery module 21 in the second direction Y. Defining $L_1=L_2$ causes a rectangular envelope of an orthographic projection of the battery module 21 perpendicular to the third direction Z to be square, so that directions of electrode terminals 3122 of battery cells 3 in different battery modules 21 can be set according to needs, which helps improve flexibility of layout of the battery modules 21.

In some embodiments, second end faces 311a of battery cells 3 of adjacent battery modules 21 are perpendicular to each other.

With the second end faces 311a of the battery cells 3 of adjacent battery modules 21 perpendicular to each other, stacking directions, that is, first directions X, of the battery cells 3 of the adjacent battery modules 21 are perpendicular to each other. In this way, adjacent battery 2 modules are not prone to problems such as deformation and displacement when the battery 2 is subjected to vibration or shock load, which helps improve bonding strength between the adjacent battery modules 21, thereby improving the structural strength of the whole battery 2.

In some embodiments, not only $L_1=L_2$ is defined, but also the second end faces 311a of battery cells 3 of adjacent battery modules 21 are perpendicular to each other. This can improve the structural strength of the battery 2 and makes maximum utilization of spaces of the battery 2 in the first direction X and the second direction Y.

In some embodiments, the battery 2 further includes a reinforcing plate 22, and the reinforcing plate 22 is disposed between adjacent battery modules 21.

Specifically, the reinforcing plate 22 may be disposed between two adjacent battery modules 21 and on an outer side of an outermost battery module 21 in the third direction Z. The reinforcing plate 22 may fit with or spaced in the third direction Z apart from a battery module 21 adjacent thereto. With such arrangement, when the battery 2 is subjected to external load such as vibration and impact, the reinforcing plate 22 can bear part of the load. This improves bearing capacity of the battery 2, so that the battery 2 is not prone to problems such as deformation and displacement, improving overall structural strength of the battery 2.

The reinforcing plate 22 may simply be a plate structure, functioning only to reinforce the structural strength of the battery 2. In addition, the reinforcing plate 22 may also integrate other functions, for example, cooling, and therefore have corresponding structures.

In some embodiments of this application, a flow channel (not shown in the figures) is formed in the reinforcing plate 22, the flow channel contains a fluid, and the fluid is used for heat exchange with the battery module 21.

Specifically, the fluid may be a liquid or gas, provided that the fluid can flow in the flow channel and implement heat exchange with the battery module 21.

It can be understood that the battery module 21 needs to be kept in an appropriate temperature range for better operation. With an appropriate temperature set for the fluid, the fluid may heat or cool the battery module 21. In some embodiments, when the battery 2 operates in an extremely cold environment, the battery modules 21 need to be heated to guarantee normal operation of the battery 2. Therefore, an appropriate temperature can be set for the fluid, so that the fluid can heat the battery modules 21 while flowing in the flow channel.

In some other embodiments, when the battery 2 operates in a normal environment, the battery modules 21 need to be cooled to guarantee normal operation of the battery 2. Therefore, an appropriate temperature can be set for the fluid, so that the fluid can cool the battery modules 21 while flowing in the flow channel.

To enable heat exchange of the fluid with the outside so that the fluid flowing in the reinforcing plate 22 is always kept at a corresponding temperature range, the flow channel in each reinforcing plate 22 may be directly connected to a related pipeline 23 outside the battery 2. Alternatively, flow channels of part or all of the reinforcing plates 22 in the battery 2 communicate with each other before communicating with the outside as whole.

In some embodiments, the battery 2 further includes a pipeline 23, and the pipeline 23 is configured to communicate flow channels of the reinforcing plates 22 adjacent in the third direction Z.

Specifically, the flow channels of the reinforcing plates 22 in the battery 2 communicate with each other via the pipeline 23, before being connected to a related pipeline 23 outside the battery 2, so that the fluids in the flow channels can exchange heat with the outside. Such arrangement can simplify the structure communicating the flow channels in the reinforcing plates 22 with the outside.

During assembling battery cells 3 into a battery group 211 or a battery 2 module, the battery cells 3 may be directly stacked, or other structures may be assembled with the battery cells 3.

In some embodiments, the battery module 21 further includes end plates 212, and the end plates 212 are disposed on two sides in the first direction X of the plurality of battery cells 3 that are stacked. The battery 2 further includes a frame 24, the frame 24 is disposed around an outer periphery of the battery module 21, and the end plates 212 connect the battery module 21 and the frame 24.

Specifically, the end plates 212 are disposed on two sides of the battery group 211 or the battery 2 module in the stacking direction of the battery cells 3. Each battery 2 module may correspond to two end plates 212, or each battery group 211 is correspondingly provided with two end plates 212. The end plates 212 helps assembling of the battery cells 3 during stacking of the battery cells 3, and the end plates 212 can protect the battery cells 3, reducing risks such as damage to the battery cells 3 during assembling. Provision of the frame 24 can further protect the battery module 21, prolonging service life of the battery module 21.

It can be understood that the end plates 212 are part of the battery module 21. In the embodiments where $L_1=L_2$ is defined for the battery module 21, the maximum length $L_1$ of the battery module 21 in the first direction X and the maximum length $L_2$ of the battery module 21 in the second direction Y are maximum lengths in the first direction X and the second direction Y, respectively, with the battery cells 3 and the end plates 212 combined. Such arrangement enables the battery cells 3 and the end plates 212 to be assembled to a structure with a square envelope.

The end plate 212 and the frame 24 may directly abut against each other, or be threaded to each other, or be buckled to each other.

Figure 7:
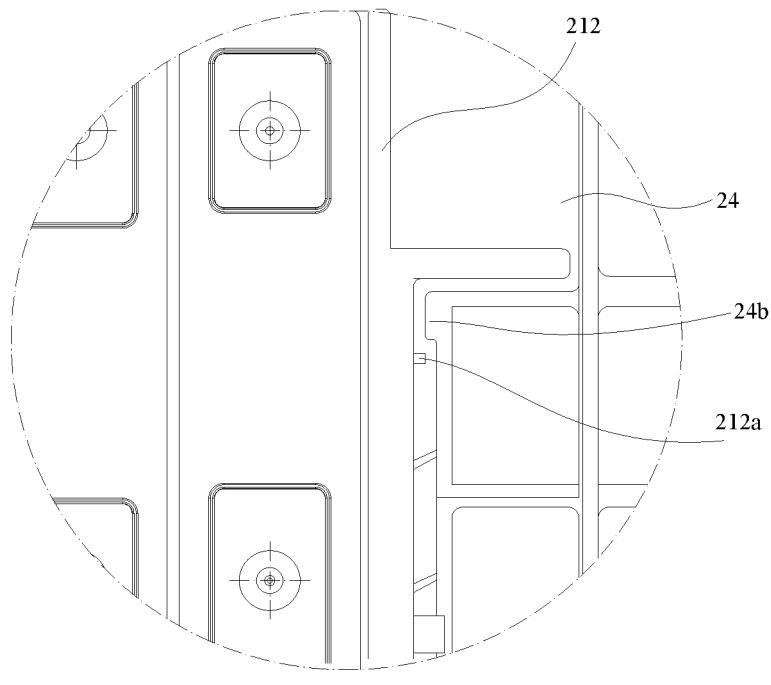
FIG. 7 is a schematic diagram of local enlargement of a connection structure of a frame and an end plate according to some embodiments of this application.

FIG. 7 is a schematic diagram of local enlargement of a connection structure of a frame 24 and an end plate 212.

In some embodiments, a first lug boss 212a is formed on the end plate 212, a second lug boss 24b is formed on the frame 24, and the second lug boss 24b is buckled to the first lug boss 212a.

Specifically, the first lug boss 212a and the second lug boss 24b may be both protrude in the first direction X or the second direction Y. As shown in FIG. 7, during mounting, the frame 24 fits around the outer periphery of the battery module 21, and the frame 24 is moved along the third direction Z so that the first lug boss 212a gradually approaches the first lug boss 212a from above the first lug boss 212a; when the first lug boss 212a and the second lug boss 24b partially overlap in the first direction X, they are in interference fit with each other; the second lug boss 24b continues be moved in the third direction Z until the second lug boss 24b passes by the first lug boss 212a and arrives below the first lug boss 212a where a force acting on the frame 24 is removed. Then, being stopped by the first lug boss 212a, the second lug boss 24b cannot return to be above the first lug boss 212a without the help of an external force. The first lug boss 212a is buckled to the second lug boss 24b.

It can be understood that buckling the end plate 212 and the frame 24 can not only ensure that the end plate 212 and the frame 24 have some connection strength but also reduce the probability of reduced internal airtightness of the battery 2 due to provision of connection holes and other structures.

One battery module 21 of the battery 2 may correspond to one frame 24, or multiple or all of battery modules 21 of one battery 2 may correspond to one frame 24, which is not limited herein.

In some embodiments, the battery 2 includes a plurality of frames 24 stacked in the third direction Z, and the frames 24 adjacent in the third direction Z are hermetically connected.

One frame 24 may be disposed around the outer periphery of only one battery module 21, that is, one frame 24 corresponds to one battery module 21; or one frame 24 may be disposed around the outer periphery of a plurality of battery modules 21, that is, one frame 24 corresponds to a plurality of battery modules 21. This may be appropriately selected according to specific application scenarios. Adjacent frames 24 may be hermetically connected by applying a sealant or be hermetically connected by disposing a sealing member in between. Adjacent frames 24 being hermetically connected can effectively reduce water and oxygen entering the battery module 21 from the outside, thereby reducing the probability of corrosion of the battery cells 3 caused by the external water and oxygen.

Figure 8:
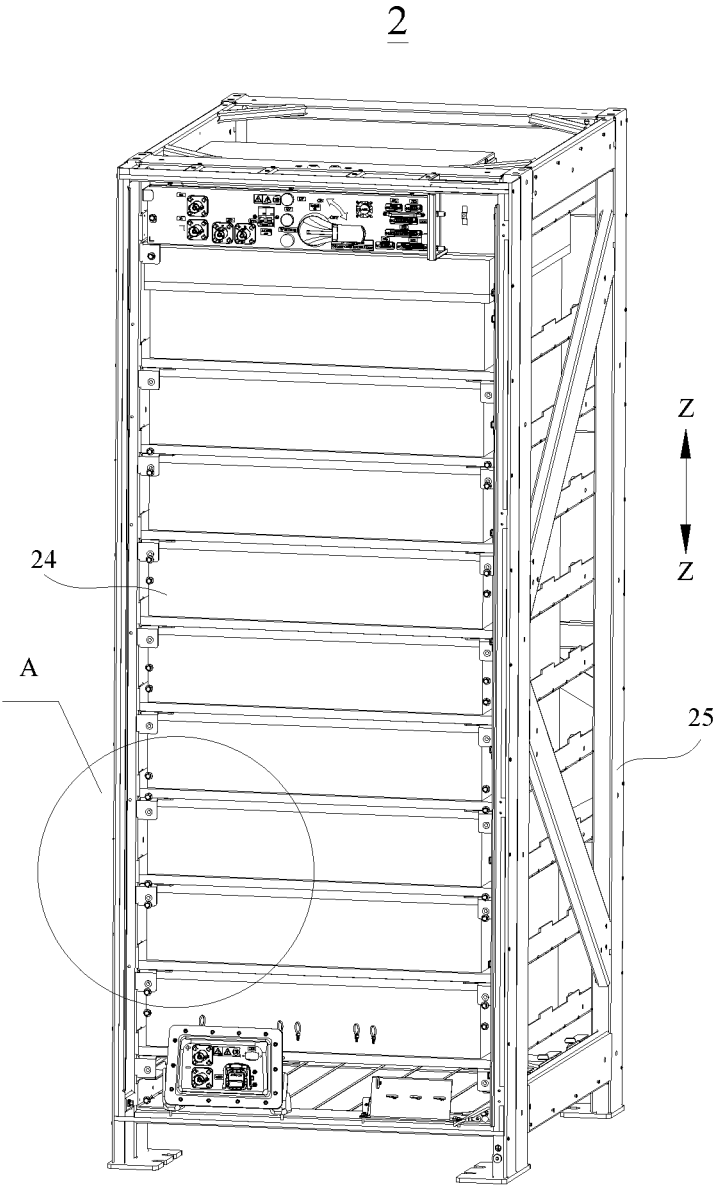
FIG. 8 is a schematic structural diagram of a battery according to another embodiment of this application.

FIG. 8 is a schematic structural diagram of a battery provided by another embodiment of this application.

In some embodiments, the battery 2 further includes a mounting rack 25, and the plurality of battery modules 21 are connected to the mounting rack 25 through the frame 24.

Specifically, an overall structure form of the mounting rack 25 fits with that of the battery modules 21 being stacked. With the battery modules 21 connected to the mounting rack 25 through the frame 24, the mounting rack 25 serves as a support structure of the battery modules 21 to bear weight of the battery modules 21. In addition, when the battery 2 is subjected to impact, the mounting rack 25 can block part of impact and vibration load for the battery modules 21, reducing the probability of damage to the battery modules 21 due to external impact and vibration. Therefore, provision of the frame 24 helps improve overall structural strength of the battery 2, making easier transportation and mounting of the battery 2 and prolonging service life of the battery 2.

Figure 9:
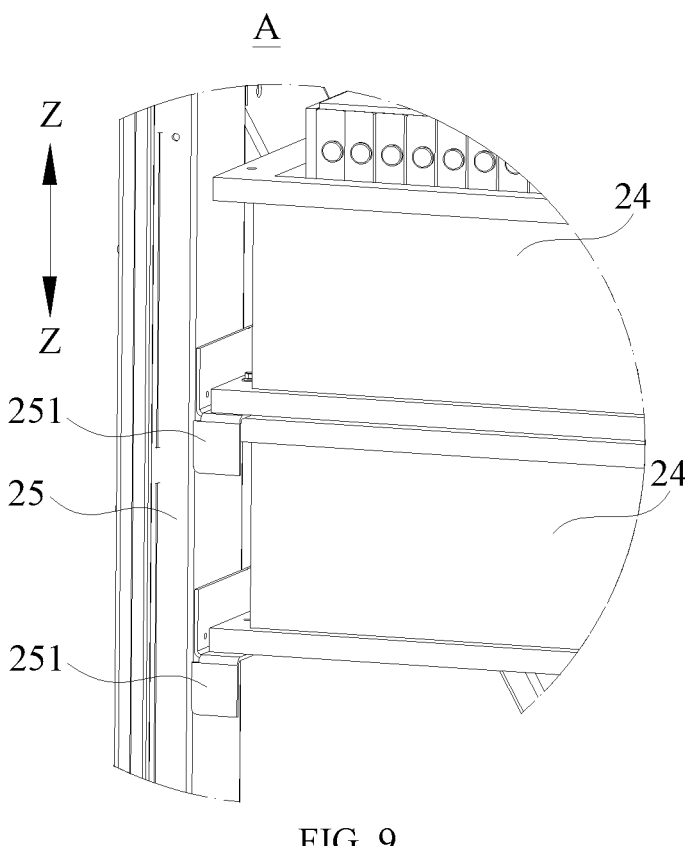
FIG. 9 is a locally enlarged view of a position A in FIG. 8.
Figure 10:
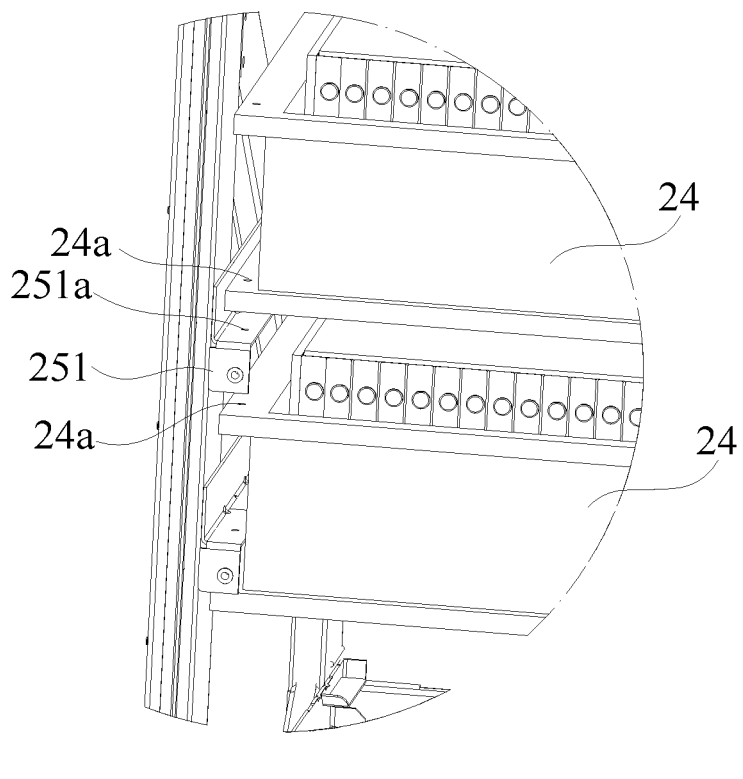
FIG. 10 is a schematic exploded view of FIG. 9.

In some embodiments, as shown in FIG. 9 and FIG. 10, a mounting plate 251 is formed on the mounting rack 25, and frames 24 in two adjacent layers are connected through the mounting plate 251.

The mounting plate 251 may be a straight plate, an L-shaped plate, or a plate in other shapes, provided that the mounting plate 251 can connect the frames 24 in two adjacent layers.

The mounting plate 251 may be integrally formed with the mounting rack 25 during manufacturing the mounting rack 25 or may be individually formed and then mounted to the mounting rack 25, which is not limited herein.

In some embodiments, as shown in FIG. 9 and FIG. 10, a first mounting hole 251a may be provided in the mounting plate 251; a second mounting hole 24a may be provided in the frame 24; two adjacent frames 24 are disposed on two sides of the mounting plate 251 in the third direction Z, respectively; and the two adjacent frames 24 are connected to the first mounting hole 251a in the mounting plate 251 through the second mounting holes 24a.

It can be understood that, with the mounting rack 25 provided with the mounting plate 251 which is connected to the battery modules 21 through the frames 24, an appropriate position of the connecting plate can be defined in advance based on mounting positions of the frames 24 and the battery modules 21. This helps placement of the battery modules 21 and the frames 24, making the battery modules 21 and the frames 24 less likely to have misplacement and deformation when they are connected to the mounting rack 25, thus reducing mounting errors and helping improve airtightness of the battery 2.

Figure 11:
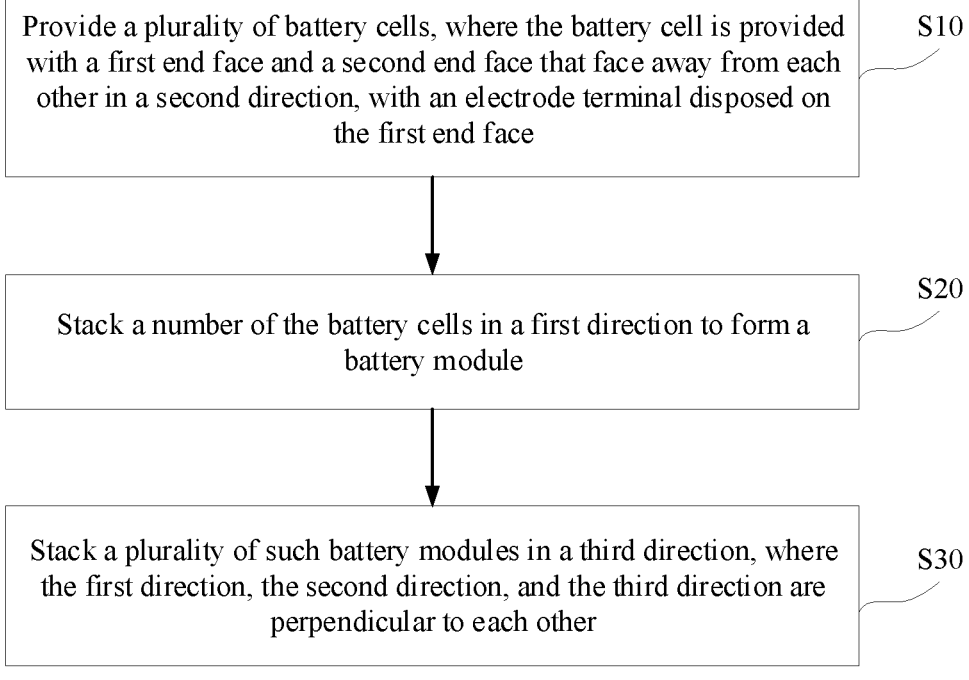
FIG. 11 is a flowchart of a manufacturing method of battery according to some embodiments of this application.

FIG. 11 is a flowchart of a manufacturing method of battery cell 3 according to some embodiments of this application.

Embodiments of this application provide a manufacturing method of battery 2, including:

S10: Provide a plurality of battery cells 3, where the battery cell 3 is provided with a first end face 3121a and a second end face 311a that face away from each other in a second direction Y, with an electrode terminal 3122 disposed on the first end face 3121a.

S20: Stack a number of the battery cells 3 in a first direction X to form a battery module 21.

S30: Stack a plurality of such battery modules 21 in a third direction Z, where the first direction X, the second direction Y, and the third direction Z are perpendicular to each other.

It should be noted that reference may be made to the battery 2 provided in the foregoing embodiments for related structures of a battery 2 manufactured by the manufacturing method of battery 2.

Figure 12:
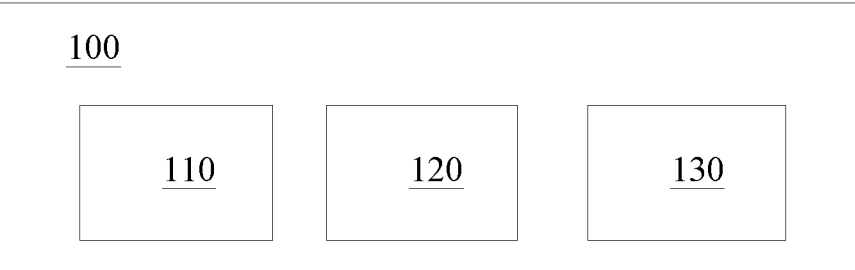
FIG. 12 is a schematic block diagram of a manufacturing system of battery according to some embodiments of this application.

FIG. 12 is a schematic block diagram of a manufacturing system 100 of battery 2 provided according to some embodiments of this application.

As shown in to FIG. 12, the manufacturing system 100 of battery 2 provided according to embodiments of this application includes:

a provision module 110, configured to provide a plurality of battery cells 3, where the battery cell 3 is provided with a first end face 3121a and a second end face 311a that face away from each other in a second direction Y, with an electrode terminal 3122 disposed on the first end face 3121a;

a first assembling module 120, configured to stack a number of the battery cells 3 in a first direction X to form a battery module 21; and a second assembling module 130, configured to stack a plurality of assembling modules in a third direction Z, where the first direction X, the second direction Y, and the third direction Z are perpendicular to each other.

For related structures of a battery 2 manufactured by the manufacturing system 100, reference may be made to the battery 2 provided in the foregoing embodiments.

It should be noted that, without conflicts, the embodiments and features in the embodiments in this application may be combined with each other.

In conclusion, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. A battery, comprising:
a plurality of battery modules, wherein each of the battery modules comprises a plurality of battery cells stacked in a first direction, the battery cell is provided with a first end face and a second end face that face away from each other in a second direction, with an electrode terminal disposed on the first end face, and the plurality of battery modules are stacked in a third direction; and, wherein the first direction, the second direction, and the third direction are perpendicular to each other, wherein the first directions of two adjacent battery modules are perpendicular to each other, and the second end faces of the battery cells of adjacent battery modules are perpendicular to each other.

2. The battery according to claim 1, wherein each of the battery modules comprises a plurality of battery groups disposed side by side in the second direction, each of the battery groups comprises a plurality of battery cells stacked in the first direction, and the second end faces of the battery cells in two adjacent battery groups face opposite directions.

3. The battery according to claim 1, characterized in that housing side walls of the battery cell comprise two first side walls opposite each other and two second side walls opposite each other, wherein an area of the first side wall is greater than that of the second side wall, and the first side wall is perpendicular to the first direction.

4. The battery according to claim 1, wherein a maximum length of the battery module in the first direction is L1, a maximum length of the battery module in the second direction is L2, and L1=L2.

5. The battery according to claim 1 wherein the battery further comprises a reinforcing plate, and the reinforcing plate is disposed between two adjacent battery modules.

6. The battery according to claim 5, wherein a flow channel is formed in the reinforcing plate, the flow channel contains a fluid, and the fluid is used for heat exchange with the battery modules.

7. The battery according to claim 6, wherein the battery further comprises a pipeline, and the pipeline is configured to communicate the flow channels of the reinforcing plates that are adjacent to each other in the third direction.

8. The battery according to claim 1, wherein the battery module further comprises end plates, and the end plates are disposed on two sides in the first direction of the plurality of battery cells that are stacked; and
the battery further comprises at least one frame, the at least one frame is disposed around an outer periphery of the battery module, and the end plates connect the battery module and the at least one frame.

9. The battery according to claim 8, wherein a first lug boss is formed on the end plate, a second lug boss is formed on the at least one frame, and the first lug boss is buckled to the second lug boss.

10. The battery according to claim 8, wherein the at least one frame comprises a plurality of frames stacked in the third direction, and the plurality of frames that are adjacent in the third direction are hermetically connected.

11. The battery according to claim 10, wherein the battery further comprises a mounting rack, and the plurality of battery modules are connected to the mounting rack through the frames.

12. The battery according to claim 11, wherein a mounting plate is formed on the mounting rack, and two adjacent frames of the plurality of frames along the third direction are connected through the mounting plate.

13. An electric apparatus, comprising the battery according to claim 1, wherein the battery is configured to supply electric energy.

14. A manufacturing method of battery, comprising:
providing a plurality of battery cells, wherein the battery cell is provided with a first end face and a second end face that face away from each other in a second direction, with an electrode terminal disposed on the first end face;
stacking a number of the battery cells in a first direction to form a battery module;
stacking a plurality of such battery modules in a third direction, wherein the first direction, the second direction, and the third direction are perpendicular to each other,
wherein the first directions of two adjacent battery modules are perpendicular to each other, and the second end faces of the battery cells of adjacent battery modules are perpendicular to each other.

15. A manufacturing system of battery, comprising:
a provision module, configured to provide a plurality of battery cells, wherein the battery cell is provided with a first end face and a second end face that face away from each other in a second direction, with an electrode terminal disposed on the first end face;
a first assembling module, configured to stack a number of the battery cells in a first direction to form a battery module; and
a second assembling module, configured to stack a plurality of the battery modules in a third direction, wherein the first direction, the second direction, and the third direction are perpendicular to each other,
wherein the first directions of two adjacent battery modules are perpendicular to each other, and the second end faces of the battery cells of adjacent battery modules are perpendicular to each other.

16. The battery according to claim 12, wherein a first mounting hole is provided in the mounting plate; a second mounting hole is provided in each one of the plurality of frames; two adjacent frames of the plurality of frames are disposed on two sides of the mounting plate in the third direction, respectively; and the two adjacent frames are connected to the first mounting hole in the mounting plate through the second mounting holes.

17. The manufacturing method according to claim 14, further comprising:

providing end plates, wherein the end plates are disposed on two sides in the first direction of the plurality of battery cells that are stacked;

providing at least one frame, wherein the frame is disposed around an outer periphery of at least one of the plurality of battery modules, and the end plates connect the plurality of the battery modules and the at least one frame; and providing a mounting rack, wherein the plurality of battery modules are connected to the mounting rack through the at least one frame.

18. The manufacturing method according to claim 17, wherein the at least one frame comprises a plurality of frames stacked in the third direction, and the method further comprises:

forming a mounting plate on the mounting rack, providing a first mounting hole in the mounting plate;

providing a second mounting hole in each one of the plurality of frames;

disposing two adjacent frames of the plurality of frames on two sides of the mounting plate in the third direction, respectively; and connecting the two adjacent frames to the first mounting hole in the mounting plate through the second mounting holes.

19. The manufacturing system according to claim 15, wherein the manufacturing system is further configured to:

provide end plates, wherein the end plates are disposed on two sides in the first direction of the plurality of battery cells that are stacked;

provide at least one frame, wherein the at least one frame is disposed around an outer periphery of at least one of the plurality of battery modules, and the end plates connect the plurality of the battery modules and the at least one frame; and provide a mounting rack, wherein the plurality of the battery modules are connected to the mounting rack through the at least one frame.

20. The manufacturing system according to claim 19, wherein the at least one frame comprises a plurality of frames stacked in the third direction, and the manufacturing system is further configured to:

form a mounting plate on the mounting rack, provide a first mounting hole in the mounting plate;

provide a second mounting hole in each one of the plurality of frames;

dispose two adjacent frames of the plurality of frames on two sides of the mounting plate in the third direction, respectively; and connect the two adjacent frames to the first mounting hole in the mounting plate through the second mounting holes.

* * * * *